Jan. 16, 1968 R. KOBLER 3,363,330
EDUCATIONAL APPARATUS
Filed Sept. 16, 1965 2 Sheets-Sheet 1

INVENTOR
RICHARD KOBLER

George H. Fritzinger
BY AGENT

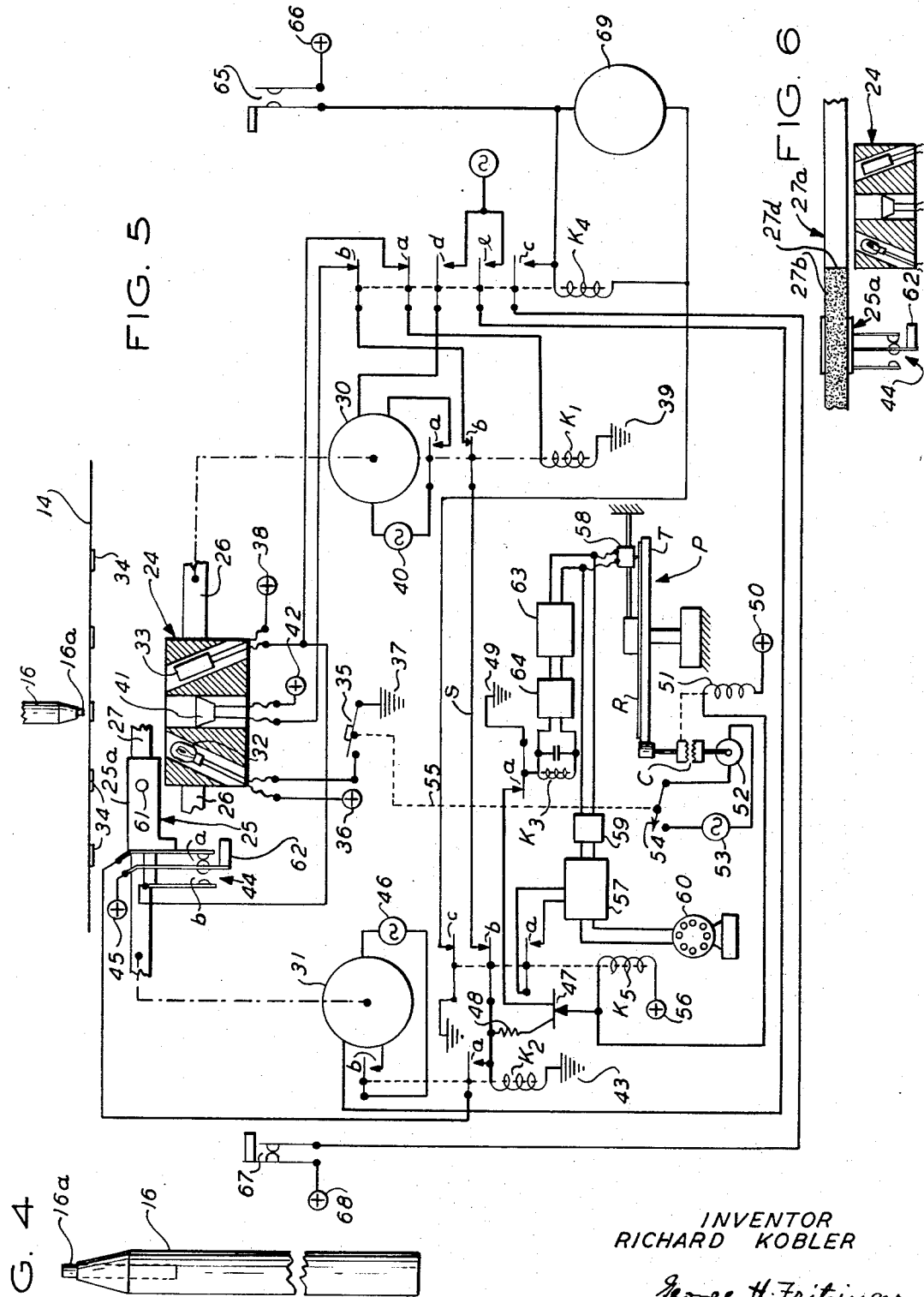

United States Patent Office 3,363,330
Patented Jan. 16, 1968

3,363,330
EDUCATIONAL APPARATUS
Richard Kobler, West Orange, N.J., assignor to McGraw-Edison Company, Elgin, Ill., a corporation of Delaware
Filed Sept. 16, 1965, Ser. No. 487,738
17 Claims. (Cl. 35—9)

ABSTRACT OF THE DISCLOSURE

This invention relates to an audio visual teaching machine wherein the pupil triggers the machine into successive operations and responses with the use of a manual pencil-like selector device by pointing or touching the tip of the selector pencil to respective areas associated with the items of information shown to the pupil. The teaching machine comprises a control carriage followed by a pointer carriage behind the working line in the pupil's information window. The control carriage carries an electric switch operable by a permanent magnet in the pupil's selector pencil when the tip of the selector pencil is brought onto the working line and pointed towards the control carriage. The control carriage determines the point of the pupil's progress along the working line. When the electric switch is operated by the selector pencil, the pointer carriage is advanced until it reaches the control carriage and a playback machine is started to speak words relating to the item selected by the pupil. The instant the pointer carriage reaches the control carriage the latter is advanced until a light beam from a light source on the control carriage strikes a black opaque dot on the back side of the sheet bearing the programmed information. So long as the playback machine is running the selector pencil is disabled. When the playback machine is stopped by a stop signal picked up from the record, the selector pencil is returned to an abled condition to start another sequence of operations when the pencil is pointed to the item of information overlying the control carriage.

---

In the present description the phrase "items of information" is utilized to include the respective lower and upper case letters, numbers, signs and symbols which appear on the keys of a typewriter, as well as words, phrases, sentences, pictures, etc.

In the present machine programmed visual information is presented to a pupil and audio information related to the visual information is reproduced as each item is pointed out by the pupil to provide an effective method of teaching children to recognize, pronounce and learn the meaning of the various characters as well as the composition of words and sentences and the answers to multiple choice questions. The audio information may comprise pronunciations, statements, questions or answers.

An object of the invention is to provide a new and effective teaching method and apparatus adapted especially for children in their early stages of learning.

Another object is to provide a new and improved teaching apparatus for children which follows a simple and natural technique adapted to excite and sustain the interest of the pupil in proceeding forwardly under his own volition through a progressive instruction course.

It is another object to provide a pointer means below the sheet bearing the program visual information which is advanced automatically to a visual item when that item is selected by the manual selector pencil. For the present purposes the sheet is preferably made of a transparent material through which a pointer light is visible. Alternatively, the pointer means may be a closed band below the working line. This band includes a lightly colored section followed by a darkly colored section each of a length at least equal to the width of the sheet, with a demarcation line between the light and dark areas forming a pointer line visible through the sheet material.

Another object is to provide an improved teaching machine which is of an economical construction enabling the machine to find wide usage in schools and homes.

These and other objects and features of the invention will be apparent from the following description and the appended claims.

In the description of my invention reference is had to the accompanying drawings, of which:

FIGURE 4 is a view of the selector pencil device used by the pupil in operating the machine;

FIGURE 5 is a schematic view of the circuits and operating mechanism for the machine, and FIGURE 6 is a fractional view showing an alternative form of pointer means for the present teaching machine.

Figure 2:
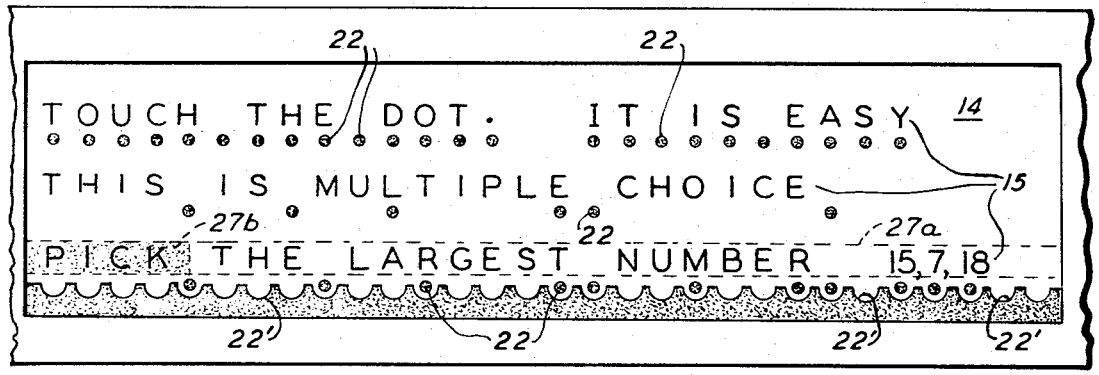
FIGURE 2 is a plan view through the front window of the teaching machine showing the pupil's work area on a sheet of programmed instruction.
Figure 1:
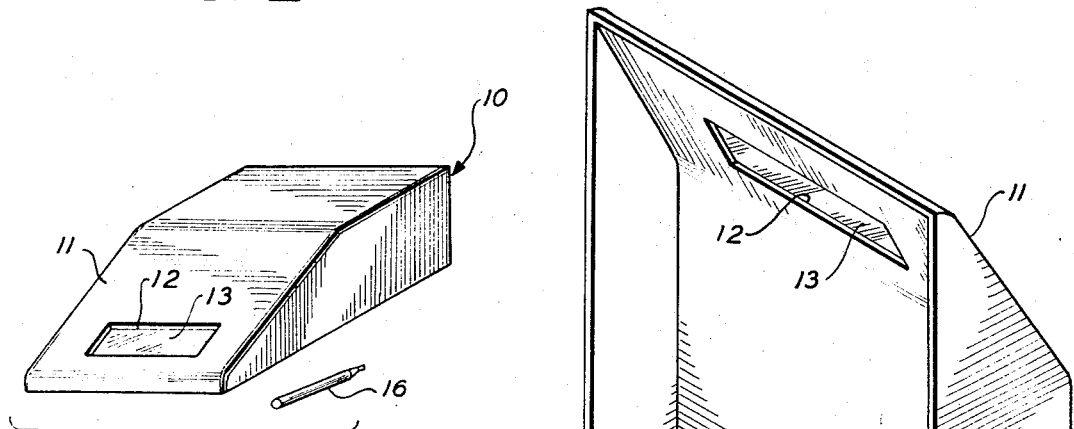
FIGURE 1 is a perspective view of the present teaching machine.
Figure 3:
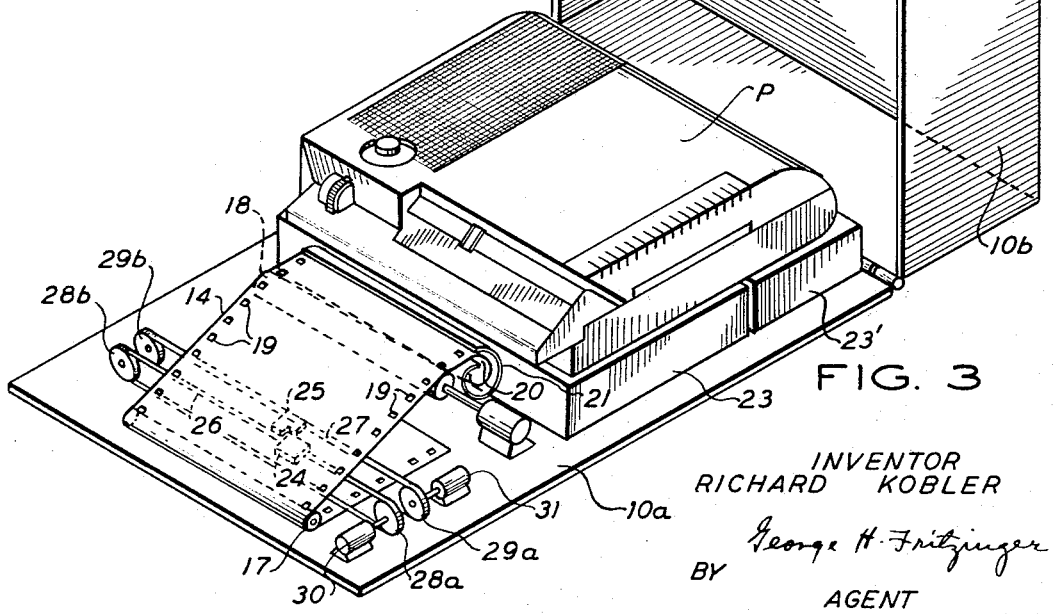
FIGURE 3 is a perspective view of the present teaching machine as seen with the cover in open position.

The present teaching machine is mounted in a rectangular case 10 having a base 10a and a hinged cover 10b (FIGURES 1 and 3). The cover 10b is provided with a sloping front wall 11 having therein a window 12 through which the pupil is shown the programmed visual material. The window is covered by a translucent plate 13 as of Lucite. Extending from front to back across the bottom side of the window 12 is a sheet 14 of a transparent material bearing successive lines 15 of letters, words, sentences, etc., representing items of information (FIGURE 2). Several lines are preferably exposed to view at a time as shown in FIGURE 2, but only the lower most line is a working line for the pupil. The machine is triggered into successive operations by use of a pencil-like device 16 shown in FIGURES 1 and 4.

The sheet 14 is fed forwardly across the bottom plate 10a and around a front guide roller 17 in a rearward-upward direction across the bottom face of the sloping wall 11 by a sprocket roller 18 engaging sprocket holes 19 in the border portions of the sheet. Beyond the sprocket roller to the rear thereof the sheet is projected through a slot 20 in a tubular container 21 to cause the sheet to curl ino a roll form as it is fed thereinto.

In the rearward portion of the case 10 there is a playback machine P of a suitable quick start-stop type which may for example be a dictating machine such as is sold under the trade name of Voicewriter. In respective boxes 23 and 23' below the playback machine P there is housed the control circuitry and the power supply.

The programmed information and the successive lines 15 comprise letters and words forming sentences which may be statements or questions. Below the letters and between the successive words are visual dots 22 preferably of a different color from that of the letters themselves. The respective visual dots represent pointing areas on the sheet where the pupil is to direct the pencil 16 to point out the items of information thereabove. As will appear, when the pupil touches the first visual dot on the working line a pointer means within the machine is moved to the right to the first letter and the machine responds by pronouncing the letter. After each pronunciation the pupil touches the next visual dot to repeat the operation of stepping ahead the pointer means and of pronouncing the letter. When a visual dot is touched at the end of a sentence the machine may explain the entire sentence. When the machine has completed a pronunciation or explanation in response to the student having touched the last visible and active dot of the working line, the sheet 14 is automatically advanced by one line and the pointer and control carriages are returned to home position, as will appear. However, several of the lines 15 past the working lines are kept in view through the window 12 to permit the pupil to read back sentences which have been spelled out. As an alternative method of instruction also illustrated by the working area shown through the window 12, a sentence just spelled out may present a multiple choice. After the pupil has proceeded through the question letter by letter, there will be no response from the machine until the pupil touches the visual dot below the correct answer.

In order that a pupil may not sweep the pencil 16 along a line of visual dots 22 and activate the machine without knowing which of the dots is the effective one, the pupil is enforced to select each dot one at a time by providing a scalloped edge in the frame structure of the window 12 along the working line having respective recesses 22' partially surrounding the respective dots 22.

The operating mechanism of the machine comprises a control carriage 24 below the window 12 movable along the working line, and a pointer carriage 25 movable also along the working line behind the control carriage. These carriages may be mounted on the upper runs of respective belts 26 and 27 (FIGURES 3 and 5) which are trained around respective pulleys 28a–28b and 29a–29b located beyond the opposite side edges of the sheet 14. The pulleys 28a and 29a are connected respectively to reversible drive motors 30 and 31.

The control carriage 24 determines the point of advance of the pupil's operation along the working line. The operation of the control carriage may be based on any of various principles. By way of illustrative example, the control carriage may be provided with a light source 32 and with a photocell 33 as of the photoconductive type, which are obliquely mounted respectively in the rear and forward portions of the carriage 24 so that they are focused on the bottom of the sheet 14 at a point midway along the length of the carriage. Provided on the bottom side of the sheet 14 is a row of control dots 34 for each line of printed material representing successive stopping points for the control carriage. The control dots 34 are of a black opaque material which are however invisible from the front side of the sheet 14. As before noted, there will not always be a control dot 34 for each visible dot 22 since it is not always desired that each visible dot shall be an active point of interest particularly as with respect to multiple choice answers to questions spelled out on the sheet.

In the standby condition of the machine, the control and pointer carriages 24 and 25 are located to the left of the working line in respective home positions to which they were returned after having been moved along the previous line of printed material. Upon closing a start switch 35 the light source 32 is activated from a battery 36 through the source to ground 37 (FIGURE 5). There being no black control dot 34 in the left margin of the working line 15, the light beam from the source 32 is reflected from the bottom side of the sheet 14 to activate the photocell 33. When the photocell 33 is activated current flows from a battery 38 through the a contacts of a relay K4 and coil of a relay K1 to ground 39. Operation of the relay K1 closes its a contacts to connect an A.C. voltage source 40 across the drive motor 30. The control carriage 24 is thereupon driven from left to right. When the light beam from the source 32 is intercepted by the first control dot 34, the photocell is deactivated to drop the relay K1 and stop the motor 30. The control carriage 24 then stands still below the first visible dot 22 in the working line 15.

Located at the center of the control carriage 24 is a normally open magnetic switch 41 (FIGURE 5). This switch stands directly below the first visible dot 22 in the working line when the carriage reaches its first stopped position. The pencil 16 is provided with a cylindrical magnet 16a (FIGURE 4) having one end projecting beyond the holder to form the tip of the pencil. When the pupil touches the first visible dot 22 with the tip of the magnetic pencil, the switch 41 is closed. This operates a relay K2 from the battery 42 via a start circuit S including the switch 41, b contacts of relay K4, b contacts of relay K1, b contacts of relay K5, and coil of relay K2 to ground 43. Operation of the relay K2 closes its a contacts to receive a hold circuit through a contacts of a switch 44 on the pointer carriage 25 to battery 45. Also, relay K2 closes its b contacts to connect an A.C. voltage source 46 across the drive motor 31 to start a forward drive of the pointer carriage 25.

At the same time that the drive motor 31 is started, a silicon controlled rectifier 47 is triggered into a conductive state from the battery 42 via the magnetic switch 41, the b contacts of the relays K4, K1 and K5, resistor 48, the rectifier 47, a contacts of relay K3 and ground 49. When the rectifier 47 becomes conductive power is supplied from a battery 50 to a clutch solenoid 51 via the rectifier 47, a contacts of relay K3 and ground 49. Operation of the clutch solenoid engages a clutch C of a playback machine P to start the turntable T from a drive motor 52. The drive motor 52 is operated from an A.C. voltage supply 53 through a start switch 54 which is closed as the start switch 35 is closed as indicated by a tie line 55. At the same time the relay K5 is activated from a battery 56 to close its a contacts to activate an audio amplifier 57 for the playback machine. Signals picked up from a record R on the turntable T by a pickup 58 are fed via an audio filter 59 and the amplifier 57 to a speaker 60. The playback machine will therefore pronounce or make a statement relating to the letter pointed out by the pupil.

The pointer carriage 25 is advanced quickly from left to right and will reach the control carriage before the playback machine is operated. On a forwardly extending arm 25a of the pointer carriage there is a light beam source 61 which is in line with the letters on the working line 15. When the pointer carriage 25 reaches the control carriage 24 the light beam from the source 61 will be centered on the letter corresponding to the visual dot last pointed out by the pupil. This light beam is made sufficiently intense so that is can be seen through the sheet 14 to indicate the letter which the playback machine will pronounce.

The instant the pointer carriage 25 reaches its letter indicating position a switch finger 62 thereon is moved against the control carriage to open the switch 44 at its a contacts and to close this switch at its b contacts. The opening of the switch 44a opens the hold circuit of the relay K2 and drops the relay. The dropping of this relay stops the drive motor 31 for the pointer carriage. The closing of the switch 44b sends a pulse from the battery 45 through the a contacts of relay K4 to activate relay K1. Relay K1 closes its a contacts to start the motor 30 for the control carriage 24. The control carriage is therefore advanced to its next letter position while the playback machine is in operation and while the pointer carriage 25 is at standstill. As the control carriage 24 is started the switch 44b is opened but by the time the switch is opened the light beam from the source 32 is moved off of the control dot 34 to activate the photocell 33 to keep the motor 30 running. The control carriage will therefore continue to advance until the light beam from the source 32 is moved onto the next control dot 34 on the bottom side of the sheet 14 at which time the photocell 33 is deactivated to stop the drive of the control carriage.

To recapitulate, the instant the pupil touches the first dot 22 in the working line with the selector pencil 16, the pointer carriage 25 is advanced quickly to the respective letter, the playback machine is started to pronounce or explain the letter, and the control carriage is then started to advance to the next succeeding letter. During the time that the playback machine P is running the b contacts of the relay K5 are held open to disable the start circuit S. Further, the start circuit S is continued to be held open during the subsequent step advance of the control carriage by the b contacts of the relay K1. During the time that the start circuit S is so held open the selector pencil 16 is ineffective to exercise any control over the machine. This ineffective condition of the selector pencil remains until both the playback machine P is stopped and the control carriage 24 is advanced to its next successive position. Further, as will appear, the selector pencil 16 is rendered also ineffective during return of the control carriage to home position after the pupil has scanned the characters in the working line. This disabling of the selector pencil 16 as a control instrument enforces a proper synchronization of the audio responses with the visual items as these items are pointed out by the pencil.

Once the playback machine P is started it continues to run until it has completed playing back the pre-recording relating to the particular letter pointed out by the pupil. When this playback is completed the playback machine P is stopped by a pre-recorded control signal on the record disk R at the end of each playback information recording. This control signal may be of a sub-audible frequency so that it will not be heard by the pupil. The control signal is fed from the pickup 58 through a low-pass filter 63 and amplifier 64 to the relay K3. Operation of the relay K3 opens its a contacts to turn off the rectifier 47 and drop the relay K5 to stop the playback machine and to mute the audio amplifier 57. By the time the playback machine P is stopped the relay K1 will also have been dropped by the light beam from the source 32 being intercepted by another control dot 34 on the underside of the sheet 14. The start circuit S will therefore be re-abled so that it can be operated again by the pupil placing the tip of the pencil 16 on the next visual dot 22 ahead of the pointer beam 61. The machine is therefore ready for repeating the cycle of operations as the next visual dot 22 is touched by the pencil 16.

When the control carriage 24 reaches the far end of its travel the carriage closes an end switch 65. Upon the relay K5 being then also in a dropped condition to close its c contacts the relay K4 will be operated from a battery 66. The instant the relay K4 is operated it obtains a hold circuit via its c contacts, a left end switch 67 and a battery 68. Simultaneously, as the relay K4 was operated from the battery 66, a rotary solenoid 69 is operated from this same battery via the right end switch 65 to advance the sheet 14 by one line. As the relay K4 is operated it also closes its d and e contacts to start the drive motors 30 and 31 for the control and pointer carriages 24 and 25 but now via different input lines to cause these drive motors to run in a reverse direction. The two carriages are therefore returned from right to left until the pointer carriage 25 hits against and opens the left end switch 67. The opening of this switch drops the relay K4 to place the machine in its start or stand-by condition. As before noted, as long as relay K4 is operated to return the carriages to their home positions, the open condition of its a contacts prevents the start relay K1 for the control carriage from being operated and the open condition of its b contacts disables the start circuit S to render the selector pencil 16 inoperative as a control instrument over the machine.

The first line in the working area shown in FIGURE 2 has a visible dot 22 for each letter and word. In response to the pupil touching the successive letter dots with the selector pencil 16 the machine pronounces the successive letters, and when the dot following a word is touched the machine pronounces the word. The pupil thus proceeds along the line, finally touching the last dot which triggers the machine into returning the pointer and control carriages and in advancing the sheet by one line.

To illustrate the different modes of operation permitted by the present invention, the visual dots are located on the second line in FIGURE 2 only to permit the pupil to select word syllables, words and sentences. Thus, upon the pupil touching the first visual dot the machine pronounces the first word "this"; upon the pupil touching the second visual dot the machine pronounces the second word "is"; but upon the pupil touching the third dot the machine pronounces the first syllable "mul" of the word "multiple." Further, when the visual dot is touched following the last word the machine may pronounce the word and follow by stating the whole sentence "This is multiple choice." This procedure of selecting and pronouncing word syllables, words and sentences is carried out also for the third line shown in FIGURE 2. However, this illustrates a multiple-choice use of the present teaching machine. Although a visual dot 22 appears below each of the possible answers there will be a control dot 34 on the underside of the machine only with respect to the correct answer, the number "18." Therefore, until the pupil touches the visual dot below the number "18," the machine will not respond to inform the pupil that he has selected the right answer.

The fact that the present teaching machine permits the uneven spacing of the control dots 34 and the placement of multiple-choice questions, makes the machine sufficiently attractive to keep the interest of a pupil for a considerable time. The use of a simple pencil-like device to select the successive items of interest and the automatic advancement of the pointer to these successive items together with the synchronized audio response provides a new mode of teaching to which children are very receptive.

An alternative form of pointer means is shown in FIGURE 6 wherein a band 27a which carries a carriage 25a for the switch 44 is of a white or colorless material provided however with a darkly colored or black section 27b of a length equal at least to the width of the sheet 14. The demarcation line 27d forms a pointer line which is visible through the transparent sheet material. Since the dark area 27b follows the pointer line 27d a dark band will be dimly visible through the sheet material 14 from the left side of the sheet to the last selected visual item. For instance, if the pupil has last selected the dot 22 following the word "pick" in the working line shown in FIGURE 2, the dark area 27b of the pointer band will have been advanced to that dot. The dimly visible dark area along the working line will thus indicate the portion of the working line along which the pupil has already progressed.

Also, alternatively, the control dots 34 may be printed with conductive ink and in place of the photocell 33 there may be provided on the carriage 24 a pair of brushes which will complete a circuit of a suitable control apparatus to stop the control carriage when the two brushes ride onto the conductive dot 34.

It will be further understood that the visual information presented to the pupil may alternatively be projected onto a screen in the window 12 instead of being printed on a sheet as particularly shown and described. Also, the visual dots below the letters, which are used only to direct the pupil's attention to particular area to which the selector pencil is to be pointed may be deleted and the pencil may instead be pointed to the letter itself to advance the machine. Still further, the selector pencil may be designed to operate on the basis of a light beam, electrical capacity or conductivity instead of magnetism. These and other modifications are intended within the scope of my invention, which I endeavor to express according to the following claims.

I claim:

1. In a teaching machine: the combination of means for exhibiting items of information to a pupil, reproducing means for speaking words relating to said respective items, a manual pencil-like selector device adapted to be held in the hand of the pupil for pointing out said respective items of information, and magnetic control means comprising a first means in said teaching machine and a second means in said selector device magnetically co-active with said first means when the tip of said pencil-like selector device is placed in adjacent relationship to predetermined ones of said items of information for producing successive actuations of said reproducing machine corresponding respectively to the selected items.

2. The teaching machine set forth in claim 1 wherein said control means comprises an electrical switch of the magnetically operable type below said exhibited items of information and said selector device includes a permanent magnet for operating said electrical switch as the selector device is placed in respective areas corresponding to said respective items.

3. In a teaching machine: the combination of means for exhibiting successive lines bearing items of information, a manual pencil-like selector device, each of said lines having individual pointing areas corresponding to the respective items, means in said machine responsive to placing the tip of said manual selector device in said pointing areas in a succession progressing from left to right for speaking words relating to the respective items, pointer means in said machine, and means responsive to the selection of each item by said selector device for advancing said pointer means to the selected item.

4. The teaching machine set forth in claim 3 wherein said pointer means comprises a light beam movable along the respective lines bearing said items of information.

5. The teaching machine set forth in claim 3 including a transparent sheet bearing said items of information, wherein said pointer means comprises a band below said sheet along said respective lines, said band having a lightly colored section followed by a darkly colored section each of a length equal at least to the width of said sheet, said sections being separated by a demarcation line forming a pointer line visible through said sheet, and said darkly colored section being visible as a dark background to indicate the portion of a line along which the pupil has progressed.

6. A teaching machine comprising a housing having means for exposing a line of successive items of information in view of a pupil, a start-stop reproducing machine having a record medium bearing respective pre-recorded spoken words relating to said successive items, start-stop control means for said reproducing machine comprising a pencil-like selector device to be held in the hand of the pupil and control means in said teaching machine co-active with said selector device when the tip of said selector device is brought in successive positions relative to said successive items of information for starting said reproducing machine to speak said respective words in sequence, means for stopping said reproducing machine when respective words are spoken, and means to disable said control means while said reproducing machine is in operation.

7. The teaching machine set forth in claim 6 including an inaudible control signal pre-recorded on said record medium immediately following the recordation of the spoken words relating to each item, and means in said teaching machine responsive to the pickup of said control signal for stopping said reproducing machine.

8. The teaching machine set forth in claim 6 including a control carriage movable along said line out of view of the pupil, means on said control carriage responsive when the control carriage is below an item in said line and the tip of said selector device is brought into a predetermined position relative to said item for starting said reproducing machine and for concurrently starting an advance movement of said control carriage to a position below the next succeeding item in said line, and means to disable said control means also while said control carriage is being moved.

9. The teaching machine set forth in claim 8 including a pointer carriage mounted for movement along said line behind said control carriage, means responsive to placing the tip of said selector device in said predetermined position relative to said item when said control carriage is at standstill in a position below said item for advancing said pointer carriage to said control carriage, means responsive to said pointer carriage reaching said control carriage for re-starting said control carriage in an advance movement to the next succeeding item, and means responsive also to said pointer carriage reaching said control carriage for starting said reproducing machine to speak the words relating to the item last selected by said selector device.

10. A teaching machine having a window for exhibiting a plurality of lines of items of information to a pupil, said lines extending crosswise of the machine and being spaced from front to back, a reproducing machine having a record medium pre-recorded with spoken words relating to the respective items in each line progressing in a predetermined sequence, a manual pencil-like selector device, and control means disposed below a border line in said window and responsive to placing the tip of said selector device in a predetermined position relative to respective items in said border line progressing in said predetermined sequence for producing successive actuations of said reproducing machine corresponding to the respective selected items.

11. The teaching machine set forth in claim 10 including a sheet bearing a multiplicity of printed lines of said items of information, means for advancing said sheet by steps to bring a new line of information into said border line position with each step advance of said sheet, a succession of pointing areas along each line representing successive places when a line is in said border position to be pointed out by said selector device for producing said successive actuations of said reproducing machine, and means operative when the tip of said selector device has been placed successively in said pointing areas to the last pointing area in said border line for activating said advancing means by one step.

12. The teaching machine set forth in claim 10 including a scalloped edge on said window along said border line providing respective recesses partially enclosing the successive pointing areas in said border line whereby to enforce the pupil to place the tip of said selector device in said respective pointing areas by respective individual motions of the selector device.

13. A teaching machine including means for supporting a sheet bearing successive lines of items of information, a window for exposing a working line to a pupil, said sheet having on the underside thereof respective opaque dark areas corresponding to the items of information on the front side thereof, a control carriage mounted below said sheet for movement along said working line, said control carriage having a source for projecting a light beam against the underside of said sheet in line with said dark areas corresponding to the working line and having a photocell for receiving the reflection of said light beam, means for starting advance movement of said control carriage from a home position at the left end of said working line, and means controlled by said photocell responsive to said light beam being intercepted by a first one of said dark areas for stopping said advance movement of said control carriage.

14. The teaching machine set forth in claim 13 wherein said sheet has respective pointing areas designated on the front side corresponding to said respective items of information, including a manual pencil-like selector device adapted to be held in the hand of the pupil and means on said control carriage responsive to placing the tip of said selector device in the pointing area of the item corresponding to the positioning of said control carriage for re-starting the advance movement of said control carriage.

15. The teaching machine set forth in claim 14 including a reproducing machine having a record medium pre-recorded with spoken words relating to the respective items in each line proceeding from left to right along the line, and means also responsive to placing the tip of said selector device in the pointing area of the particular item corresponding to the positioning of said control carriage for producing an actuation of said reproducing machine corresponding to said particular item.

16. The teaching machine set forth in claim 15 including a pointer carriage behind said control carriage mounted for movement along said working line, means for starting an advance movement of said pointer carriage responsive to placing the tip of said selector device in the pointing area of the item corresponding to the positioning of said control carriage, and switch means operable by engagement of said pointer carriage with said control carriage for controlling the re-starting means of said control carriage and the actuation-producing means of said reproducing machine, said re-starting means being maintained by reactivation of said photocell as said light beam is moved off of said one dark area and being stopped as said light beam is intercepted by a next one of said dark areas.

17. A teaching machine having a sheet medium bearing a plurality of lines of successive items of information, a window for exposing any selected line in view of a pupil, a start-stop reproducing machine having a record medium bearing respective pre-recorded spoken words in sequence relating to said successive items, start-stop means for said reproducing machine comprising a control carriage below said sheet advanceable along said window, a pointer carriage behind said control carriage, a manual pencil-like selector device, and control means coactive with said selector device when the tip of said selector device is brought into a predetermined position relative to an item of information exposed by said window while said control carriage is at standstill below said item for advancing said pointer carriage to said control carriage and thereupon starting said reproducing machine and advancing said control carriage to a next succeeding item, means responsive to placing the tip of said selector device in said predetermined relation to a last item in said line for advancing said sheet by one line and returning both of said carriages to their start positions when said reproducing machine has spoken the words relating to said last item, and means rendered operative during said sheet advance and during the return of said carriages to place said control means in a disabled condition wherein it is unresponsive to said selector device.

References Cited
UNITED STATES PATENTS

| | | | |
|---|---|---|---|
| 2,516,579 | 7/1950 | Leonardson | 84—405 |
| 2,787,669 | 4/1957 | Flan et al. | 179—100.1 |
| 3,112,569 | 12/1963 | Moore et al. | 35—5 |
| 3,136,072 | 6/1964 | Ross | 35—5 |
| 3,221,420 | 12/1965 | Heinberg | 35—35 |

JEROME SCHNALL, *Primary Examiner.*

EUGENE R. CAPOZIO, *Examiner.*

R. W. WEIG, *Assistant Examiner.*